(12) United States Patent
Roman

(10) Patent No.: US 8,857,467 B2
(45) Date of Patent: Oct. 14, 2014

(54) PNEUMATICALLY DETENTED PILOT VALVE

(75) Inventor: Timothy Sean Roman, Minnetonka, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 13/321,217

(22) PCT Filed: May 19, 2010

(86) PCT No.: PCT/US2010/035395
§ 371 (c)(1),
(2), (4) Date: Nov. 18, 2011

(87) PCT Pub. No.: WO2010/135419
PCT Pub. Date: Nov. 25, 2010

(65) Prior Publication Data
US 2012/0060941 A1    Mar. 15, 2012

Related U.S. Application Data

(60) Provisional application No. 61/179,422, filed on May 19, 2009.

(51) Int. Cl.
*F16K 1/44* (2006.01)
*F16K 31/124* (2006.01)
*F16K 3/24* (2006.01)

(52) U.S. Cl.
CPC ............... *F16K 31/124* (2013.01); *F16K 3/246* (2013.01)
USPC .................... 137/614.18; 137/625.6; 251/120

(58) Field of Classification Search
USPC ............. 137/455–478, 614.18, 614.2, 625.6; 251/16, 22, 28, 32, 73, 47, 48, 49, 50, 251/51, 52, 53, 55, 63.4, 75, 77, 79, 80, 81, 251/117, 118, 120, 121, 901, 37
See application file for complete search history.

(56) References Cited

U.S. PATENT DOCUMENTS 1,665,832 A * 4/1928 Wright ............................ 251/22
1,925,412 A * 9/1933 Sloan ............................ 137/245
(Continued)

FOREIGN PATENT DOCUMENTS

EP    1008789    6/2000

OTHER PUBLICATIONS

Graco Inc.'s The Glutton Pump Conversion Kit Instructions—Part List dated Apr. 1988 showing prior art pilot valve on p. 7.

(Continued)

*Primary Examiner* — John Rivell
*Assistant Examiner* — Matthew W Jellett
(74) *Attorney, Agent, or Firm* — Kinney & Lange, P.A.

(57) ABSTRACT

The 4-way valve used to control the operation of a pneumatic motor can be pneumatically operated such as by a pilot valve. The pilot valve (20) works by creating a restriction at the high-pressure air/signal port (22) regardless of the pressure drop up-stream of the pilot valve (20) while still allowing for adequate flow once the valve (20) is actuated. An additional slide valve (24) is added to the pilot valve (20) that restricts the inlet 30 of the pilot valve (20) above the poppet valve (28) that creates a pressure drop, see FIG. 3. The extra pressure drop forces the valve (20) to snap open once the actuator pin (32) contacts the poppet valve (20) to create the hysteresis. Once the valve (20) snaps open, the slide valve (24) moves to uncover the high-pressure ports (22), removing the restriction to ensure that the main 4-way (10) fully actuates.

4 Claims, 3 Drawing Sheets

(56) References Cited

U.S. PATENT DOCUMENTS

| | | | |
|---|---|---|---|
| 2,659,384 A * | 11/1953 | Lowe | 137/599.18 |
| 2,667,896 A * | 2/1954 | Kanuch | 137/614.11 |
| 2,687,869 A * | 8/1954 | Kanuch | 251/30.04 |
| 3,519,011 A * | 7/1970 | Pennanen | 137/102 |
| 3,631,888 A * | 1/1972 | Anton et al. | 137/522 |
| 3,896,844 A * | 7/1975 | Schumacher | 137/488 |
| 4,085,772 A * | 4/1978 | Roger | 137/464 |
| 4,241,759 A * | 12/1980 | Billeter | 137/636.4 |
| 4,471,940 A * | 9/1984 | Zeuner et al. | 251/51 |
| 4,789,131 A * | 12/1988 | Vork | 251/28 |
| 5,694,965 A | 12/1997 | Roulet | |
| 6,152,705 A * | 11/2000 | Kennedy et al. | 417/395 |
| 6,644,345 B2 * | 11/2003 | Dulin | 137/462 |

OTHER PUBLICATIONS

Graco Inc.'s The Glutton Pump Instructions—Part List dated Oct. 1988 showing prior art pilot valve on p. 23.

* cited by examiner

PNEUMATICALLY DETENTED PILOT VALVE

TECHNICAL FIELD

This application claims the benefit of U.S. application Ser. No. 61/179,422, filed May 19, 2009, the contents of which are hereby incorporated by reference.

BACKGROUND ART

The 4-way valve used to control the operation of a pneumatic motor can be either mechanically operated or pneumatically operated. When the valve is pneumatically operated, the valve is actuated by a pilot system; usually a pair of pilot valves that sense when the pump is at one extreme or the other of the pump's travel, see FIG. 1.

Current methods to pneumatically detent the pilot valves and create the desired hysteresis involve incorporating a storage springs and a poppet valve, see FIG. 2. When the valve is at rest, the air pressure above the poppet valve is higher then the pressure bellow it, which is usually atmospheric pressure. This differential pressure creates a net force that keeps the valve closed. To actuate the valve, the actuation pin is pressed, which compresses the storage spring until the pin comes in contact with the poppet valve. At this point the valve starts to open and the pressure above the poppet valve should start to drop. When this pressure drops, the force that keeps the valve closed is no longer present and the storage spring can expand back out to its nominal length and snap the valve open, creating the desired hysteresis.

Problems can occur with this method when the pressure above the poppet valve does not drop due to such variables as system volume, leaks, etc. If the pressure does not drop, the pilot valve does not snap open and create the desired hysteresis.

DISCLOSURE OF THE INVENTION

The invention allows for the proper snap action and increased hysteresis of a pneumatically detented valve independent of the pneumatic circuit that it is controlling without affecting the flow of the valve once it has been actuated.

The invention works by creating a restriction at the high-pressure air/signal port regardless of the pressure drop upstream of the pilot valve while still allowing for adequate flow once the valve is actuated.

An additional slide valve is added to the pilot valve that restricts the inlet of the pilot valve above the poppet valve that creates a pressure drop, see FIG. 3. The extra pressure drop forces the valve to snap open once the actuator pin contacts the poppet valve to create the hysteresis. Once the valve snaps open, the slide valve moves to uncover the high-pressure ports, removing the restriction to ensure that the main 4-way fully actuates.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
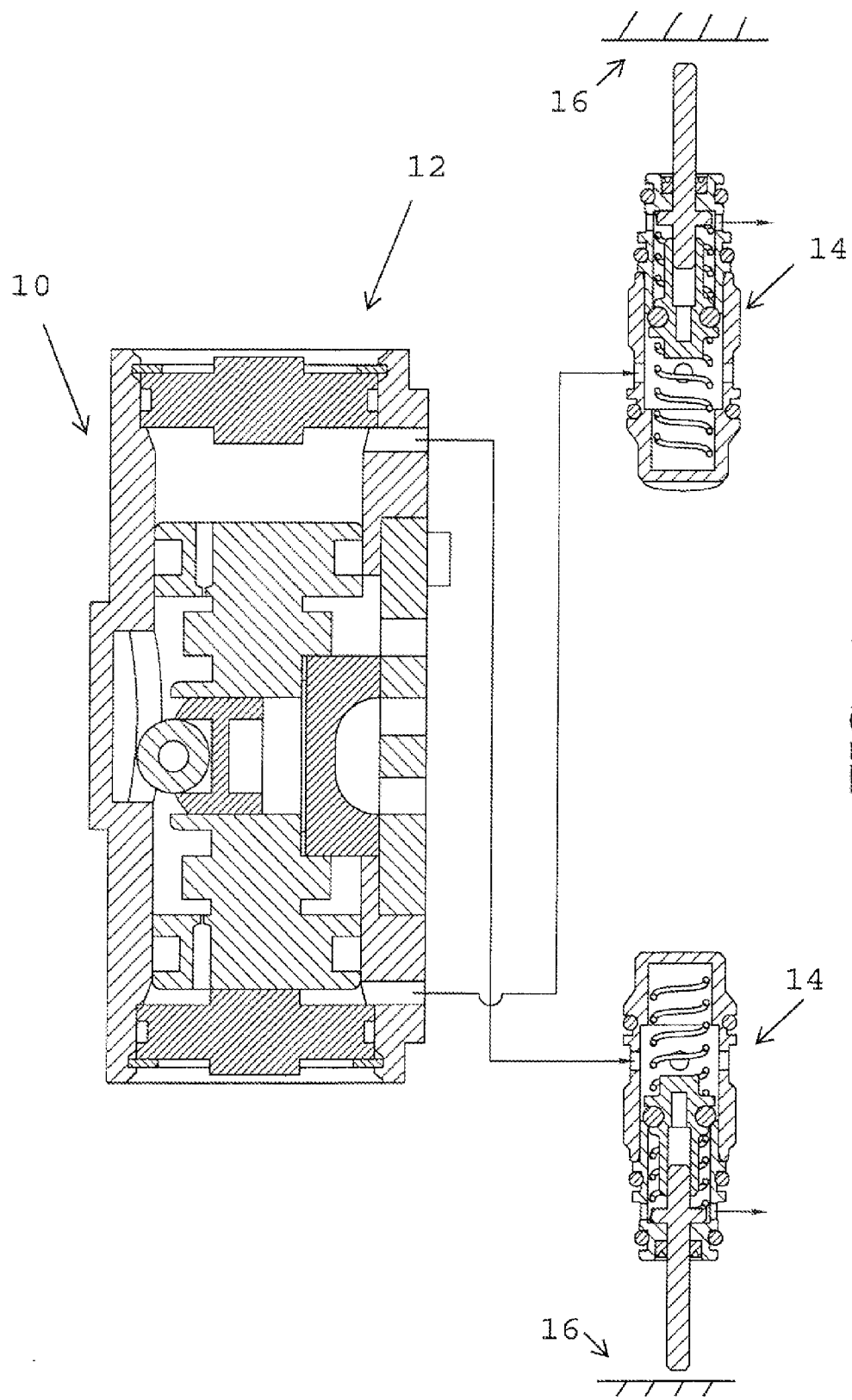
FIG. 1 shows a prior art type pneumatic motor valve system.
Figure 2:
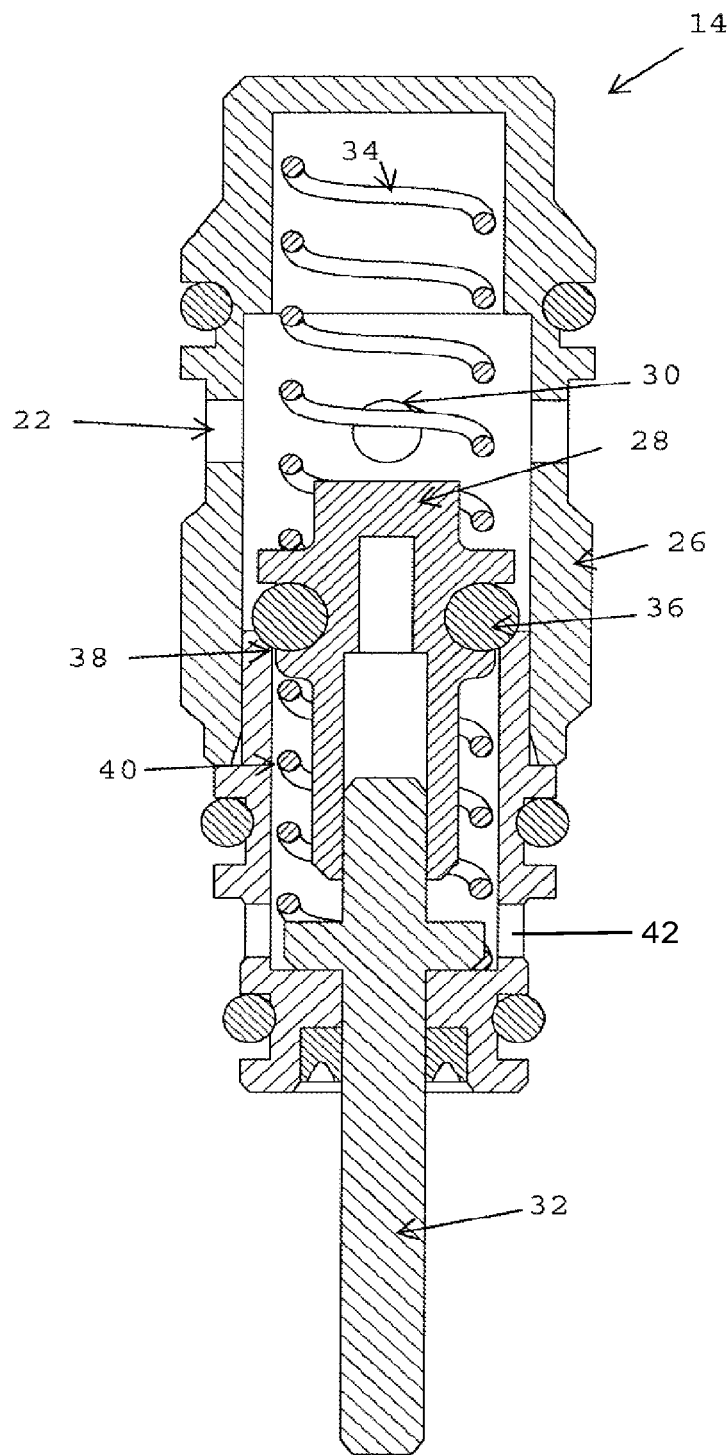
FIG. 2 shows the pilot valve as utilized in a prior art system such as that of FIG. 1.

A 4-way valve 10 is commonly used to control the operation of a pneumatic motor 12 and can be pneumatically operated. Such 4-way valves 10 are in general well-known. The valve 10 is actuated by a pilot system; usually a pair of pilot valves 14 that sense when the pump (piston 16 or other part) is at one extreme or the other of the pump's travel, see FIG. 1. The prior art pilot valve is designated 14 as shown in FIGS. 1 and 2 while the pilot valve of the instant invention is designated 20 and shown in FIG. 3. Similar analogous parts of the prior art valve 14 and the inventive valve 20 are given the same number.

The prior art valve 14 is comprised of a housing 26 having a poppet valve 28 therein along with a high pressure air inlet port 30. An actuation pin 32 slides in the bottom of poppet 28 until it contacts the bottom of poppet 28 forcing movement. An upper spring 34 biases poppet 28 downwardly to press sealing o-ring 36 against seat 38 in housing 26. A(n energy) storage spring 40 biases actuation pin 32 away from poppet 28. A low pressure vent port 42 allows exhaust from the pilot valve. A high-pressure air/signal port 22 is connected to the 4-way valve 10.

Ideally the pilot valves 14 possess some hysteresis. The hysteresis in the valve helps to improves performance by preventing the pilot valve from immediately closing when the air motor 12 changes direction ensuring that the pilot valve 14 is open long enough to adequately actuate the main 4-way valve 10.

The instant invention valve 20 works by creating a restriction at the high-pressure air/signal port 22 regardless of the pressure drop upstream of the pilot valve 20 while still allowing for adequate flow once the valve 20 is actuated.

Figure 3:
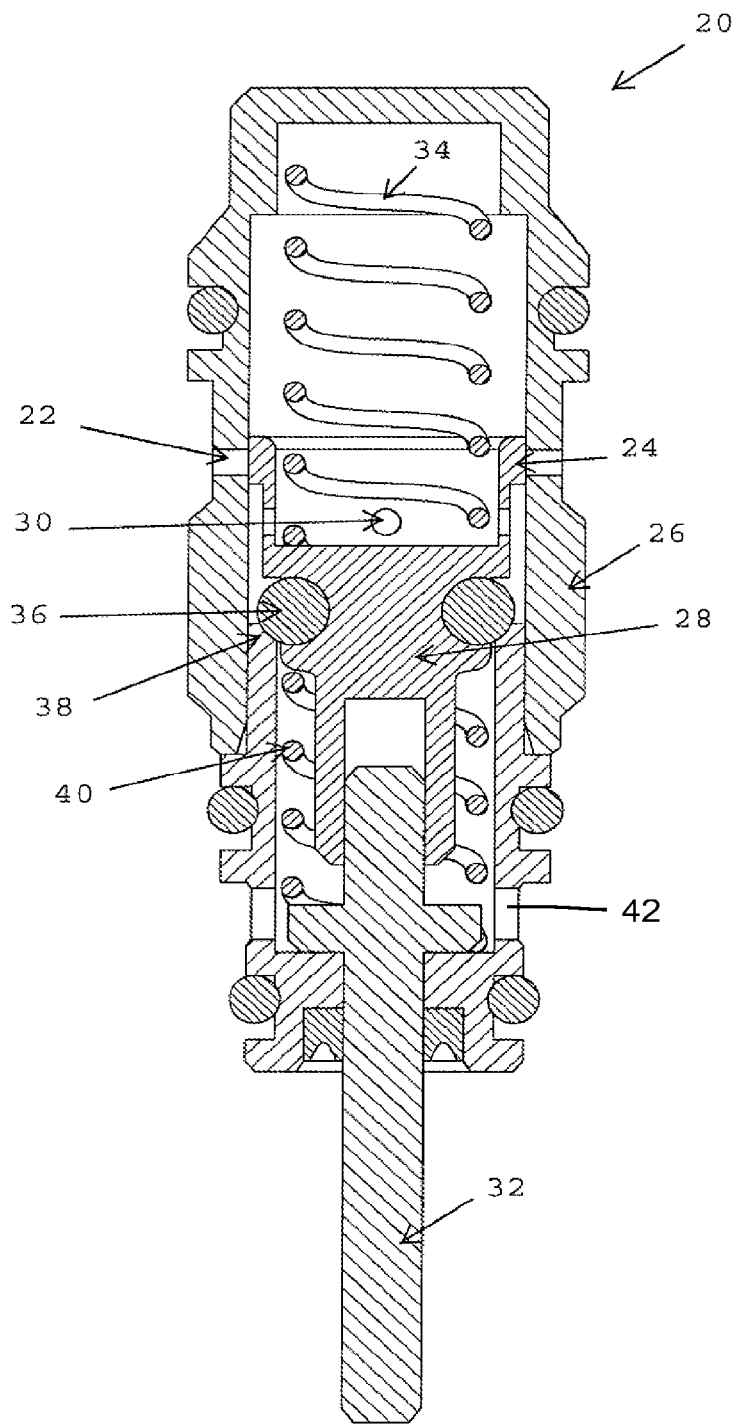
FIG. 3 shows the pilot valve of the instant invention.

An additional slide valve 24 is added to the pilot valve 20 that restricts the signal port 22 of the pilot valve 20 above the poppet valve 28 that creates a pressure drop, see FIG. 3. The extra pressure drop forces the valve 20 to snap open once the actuator pin 32 contacts the poppet valve 28 to create the hysteresis. Once the valve 28 snaps open, the slide valve 24 moves to uncover the high-pressure ports 22, removing the restriction to ensure that the main 4-way 10 fully actuates.

It is contemplated that various changes and modifications may be made to the pilot valve without departing from the spirit and scope of the invention as defined by the following claims.

The invention claimed is:

1. A pilot valve in combination with a 4-way valve in a pneumatic motor, said pilot valve comprising:
    a signal port disposed to receive high pressure gas from the 4-way valve;
    a poppet valve actuatable to vent the high pressure via a vent port;
    an actuation pin positioned to actuate the poppet valve; and
    a slide valve disposed to restrict the signal port whenever the poppet valve is not actuated, thereby creating a pressure drop, wherein the slide valve comprises an annular flange extending from the poppet valve to abut the signal port.

2. The pilot valve of claim 1 wherein said slide valve creates a restriction at said signal port regardless of the pressure drop upstream of said pilot valve while still allowing for adequate flow from the signal port to the vent port once said pilot valve is actuated.

3. The pilot valve of claim 1, further comprising:
- a storage spring disposed to bias the actuation pin away from the poppet valve; and
- an upper spring disposed to bias the poppet valve against an O-ring.

4. The pilot valve of claim 1, wherein the slide valve is formed integrally with the poppet valve.

* * * * *